United States Patent
Bellini

(10) Patent No.: US 7,168,537 B2
(45) Date of Patent: Jan. 30, 2007

(54) GRIP DEVICE FOR A MOVABLE WHEEL MOUNTED OBJECT

(75) Inventor: Claudio Francesco Bellini, Milan (IT)

(73) Assignee: Sunstar, Inc., Takatsuki (JP)

( * ) Notice: Subject to any disclaimer, the term of this patent is extended or adjusted under 35 U.S.C. 154(b) by 0 days.

(21) Appl. No.: 10/181,835

(22) PCT Filed: Jan. 19, 2001

(86) PCT No.: PCT/EP01/00582

§ 371 (c)(1),
(2), (4) Date: Oct. 4, 2002

(87) PCT Pub. No.: WO01/52687

PCT Pub. Date: Jul. 26, 2001

(65) Prior Publication Data

US 2003/0132079 A1   Jul. 17, 2003

(30) Foreign Application Priority Data

Jan. 21, 2000  (IT) .................. MI20000031 U

(51) Int. Cl.
  *A45C 13/26* (2006.01)
(52) U.S. Cl. .................... 190/115; 190/18 A; 16/113.1
(58) Field of Classification Search ............... 16/113.1, 16/116, 438, 111.1; 190/115, 18 A; 294/156
  See application file for complete search history.

(56) References Cited

U.S. PATENT DOCUMENTS

| 1,197,190 | A |   | 9/1916 | Dunn et al. |
| 3,384,292 | A |   | 5/1968 | Hidding |
| 4,128,252 | A |   | 12/1978 | Raniero |
| 4,245,763 | A |   | 1/1981 | Weinberg |
| 4,256,320 | A |   | 3/1981 | Hager |
| 4,391,344 | A | * | 7/1983 | Weber et al. ............... 180/271 |
| 4,402,542 | A |   | 9/1983 | Kreutzer |
| 4,505,495 | A |   | 3/1985 | Foss et al. |

(Continued)

FOREIGN PATENT DOCUMENTS

| DE | P 36 36 064.3 | 10/1986 |
| EP | 92121134.8 | 11/1999 |
| GB | 9921900.8 | 10/1996 |
| WO | WO 99/34701 | 7/1999 |

OTHER PUBLICATIONS

PCT International Search Report for PCT/EP01/00582.

*Primary Examiner*—Tri M. Mai
(74) *Attorney, Agent, or Firm*—Armstrong, Kratz, Quintos, Hanson & Brooks, LLP

(57) ABSTRACT

An object (2) mounted on wheels (4) has a grip device (1) of the type wherein a free end (10) of a telescopically extensible supporting structure (8) carries an integral grip portion (9) substantially parallel to an axis of rotation (6) of the wheels (4); according to the invention, the grip portion (9) has first (11) and second (12) articulating means enabling the grip portion (9) to rotate, with respect to the supporting structure (8), about two distinct axes of rotation (13, 14) perpendicular to each other; and angular locking means (33, 34) for preventing rotation of the grip portion (9) with respect to the supporting structure (8), and ensuring firm but reversible connection of the grip portion (9) to the supporting structure (8) in a predetermined mutual position. A third articulating means (35) enables the grip portion (9) to translate along one of the axes of rotation (13).

22 Claims, 4 Drawing Sheets

U.S. PATENT DOCUMENTS

| | | |
|---|---|---|
| 4,538,709 A | 9/1985 | Williams et al. |
| 4,558,896 A | 12/1985 | Farnworth |
| 4,596,397 A | 6/1986 | Conti |
| 4,679,670 A | 7/1987 | Wickman |
| 4,708,357 A | 11/1987 | Soderbaum |
| 4,730,863 A | 3/1988 | Guadnola |
| 4,759,431 A | 7/1988 | King et al. |
| 4,791,702 A | 12/1988 | McVey |
| 4,838,396 A | 6/1989 | Krenzel |
| 4,852,705 A | 8/1989 | Cowan, Jr. |
| 4,887,825 A | 12/1989 | Allen et al. |
| 4,890,335 A | 1/1990 | Crowson |
| 5,048,649 A | 9/1991 | Carpenter et al. |
| 5,090,691 A | 2/1992 | Pollock |
| 5,197,579 A | 3/1993 | Bieber et al. |
| 5,207,440 A | 5/1993 | Liang |
| 5,249,438 A | 10/1993 | Rhaney et al. |
| 5,265,307 A | 11/1993 | Hull et al. |
| 5,319,829 A | 6/1994 | Manuel |
| 5,339,934 A | 8/1994 | Liang |
| 5,351,793 A | 10/1994 | Gibbs |
| 5,353,900 A | 10/1994 | Stilley |
| 5,405,002 A | 4/1995 | Troia |
| 5,464,080 A | 11/1995 | Lians |
| 5,474,162 A | 12/1995 | Shyr et al. |
| 5,562,189 A | 10/1996 | Chen |
| 5,564,538 A | 10/1996 | Sadow |
| 5,586,778 A | 12/1996 | Lindh et al. |
| 5,685,552 A | 11/1997 | Osaki |
| 5,704,672 A | 1/1998 | Sims |
| 5,722,118 A | 3/1998 | Hansen et al. |
| 5,791,014 A | 8/1998 | Wong |
| 5,878,853 A | 3/1999 | DeRouen et al. |
| 5,890,570 A | 4/1999 | Sadow |
| 5,934,425 A | 8/1999 | Sadow |
| 6,360,402 B1 * | 3/2002 | Crabtree ..................... 16/430 |

* cited by examiner

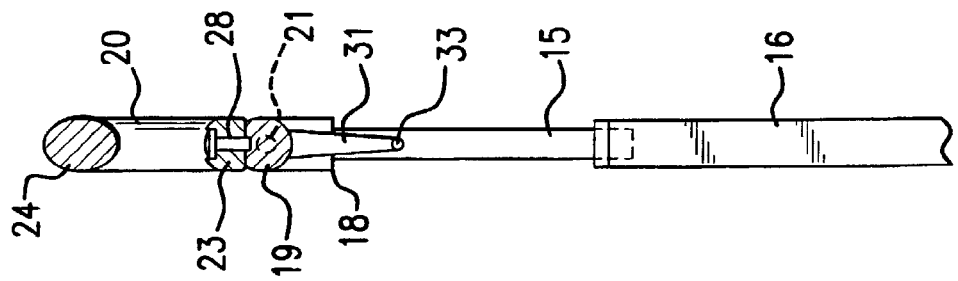
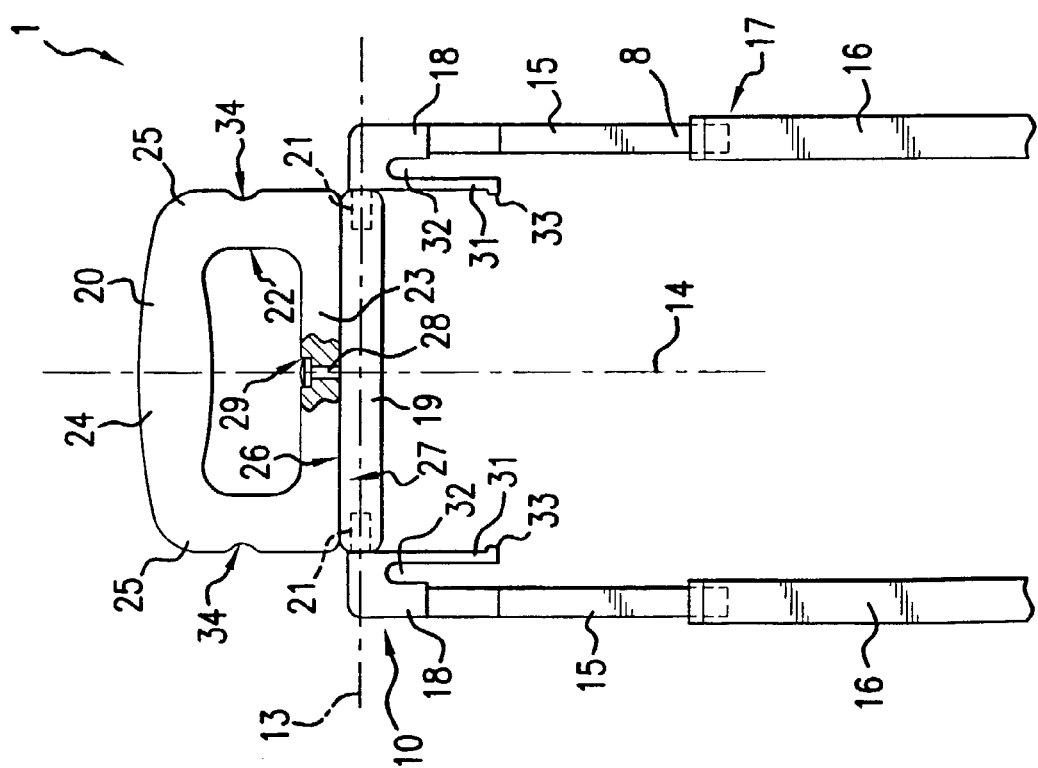

GRIP DEVICE FOR A MOVABLE WHEEL MOUNTED OBJECT

CROSS-REFERENCE TO RELATED APPLICATIONS

This application claims priority to Italian Patent Application No. MI20000000031, entitled Grip Device For A Movable Wheel Mounted Object, In Particular A Suitcase Or Luggage Trolley," filed Jan. 21, 2000.

FIELD OF THE INVENTION

The present invention relates to a grip device for a movable wheel-mounted object, such as a suitcase, luggage trolley, wheelable backpack, etc.

BACKGROUND OF THE INVENTION

Numerous types of suitcases fitted with wheels for easy transport are known in particular, some are known to comprise, at respective opposite ends, a pair of wheels, and an extensible handle by which to tow the suitcase, once the suitcase is placed on the ground and inclined with respect to the vertical. The handle is normally defined by two telescopic rods connected by a transverse grip portion parallel to the wheel axis and, therefore, substantially perpendicular to the walking direction of the user.

A major drawback of handles of the above type lies in the unnatural position of the user's hand on the grip portion of the handle when towing the suitcase, i.e. with the wrist rotated with respect to the walking direction. Such a position is not only uncomfortable but also harmful, especially if maintained for a prolonged period with a heavy load. Moreover, known handles fail to provide for "steering" the suitcase easily and effortlessly to turn corners or change direction.

Prior art add-on devices, such as those described in U.S. Pat. No. 5,878,853 to DeRouen et al. and U.S. Pat. No. 5,722,118 to Hansen et al., are intended to alleviate the arm and/or wrist strain of a user pulling a wheeled object. However, the DeRouen and Hansen devices are not integral with the handles of luggage items—they are separate attachments for adding-on to the handles of existing luggage items. As a result, these devices do not fold neatly away when the telescoping handle they are attached to is collapsed for baggage checking or storage. If left attached when not in use, these devices may become dislodged during baggage handling. If removed, the add-on device must be re-attached to the luggage item to be used. Thus, these prior art devices may be easily lost or misplaced during travel and effectively require that a user repeatedly attach and detach the device to a piece of luggage during travel. Further, these add-on devices are connected to existing pieces of luggage using detachable elements, such as clips, hooks, snaps, straps, Velcro® strips, etc., which do not provide a very structurally durable or stable connection. These bulky connections also encumber traditional use of the luggage handle, rather than the attached add-on device, which might be desirable when lifting the luggage and/or negotiating very rough terrain.

SUMMARY OF THE INVENTION

It is an object of the present invention to provide an integral grip device designed to eliminate the aforementioned drawbacks of known handles, and which at the same time is inexpensive, easy to use, and easy to manufacture.

According to the present invention, there is provided a grip device for a movable object mounted on wheels, in particular, a suitcase or luggage trolley, of the type comprising a supporting structure, and a grip portion connected to and integral with the supporting structure and substantially parallel to an axis of rotation of said wheels; the device being is characterized by comprising first and second articulating means respectively permitting rotation of said grip portion about a first and a second axis of rotation perpendicular to each other.

Preferably, the first axis of rotation is parallel to the axis of rotation of the wheels, and the first articulating means permits rotation of the grip portion with respect to the supporting structure between a first work position, wherein the grip portion projects from a free end of the supporting structure, and a second work position, wherein the grip portion is turned 180° with respect to the first work position and collapsed inside the supporting structure.

The device may further comprise a third articulating means, such as a slidable sleeve, for permitting translation of the grip portion with respect to the supporting structure along the first axis of rotation. In yet another embodiment, the device may further comprise biasing means, such as one or more friction washers, for biasing the grip portion in the first work position.

An important aspect of the integral grip device of the present invention lies in the device also comprising angular locking means for preventing rotation of the grip portion with respect to the supporting structure, so as to keep the grip portion firmly and reversibly connected to the supporting structure when the grip portion is in the second work position.

The device according to the invention therefore not only preserves the functional features of known handles—compactness when withdrawn and easy grip when extracted—but also provides for several additional advantages. In particular, the device according to the invention enables the user to grip the suitcase (or any other object to which the device is fitted) with his or her wrist in a more comfortable, efficient position, as opposed to rotated at an unnatural angle. At the same time, the device enables the suitcase to be steered—either pushed or pulled—easily and effortlessly in any situation, to change direction, turn corners, work around obstacles, etc. In the collapsed position, the grip portion is connected integrally to the supporting structure, thus enabling uneven surfaces to be negotiated without straining the potentially weaker articulating elements. Finally, the device as a whole is particularly strong, as well as being compact and inexpensive to manufacture.

BRIEF DESCRIPTION OF THE DRAWINGS

A non-limiting embodiment of the present invention will be described by way of example with reference to the accompanying drawings, in which:

FIG. 2 shows a larger-scale front view of the FIG. 1 grip device in a first work position;

FIG. 3 shows a partially sectioned side view, with parts removed for clarity, of the FIG. 2 device;

DETAILED DESCRIPTION OF THE PREFERRED EMBODIMENTS

Figure 1:
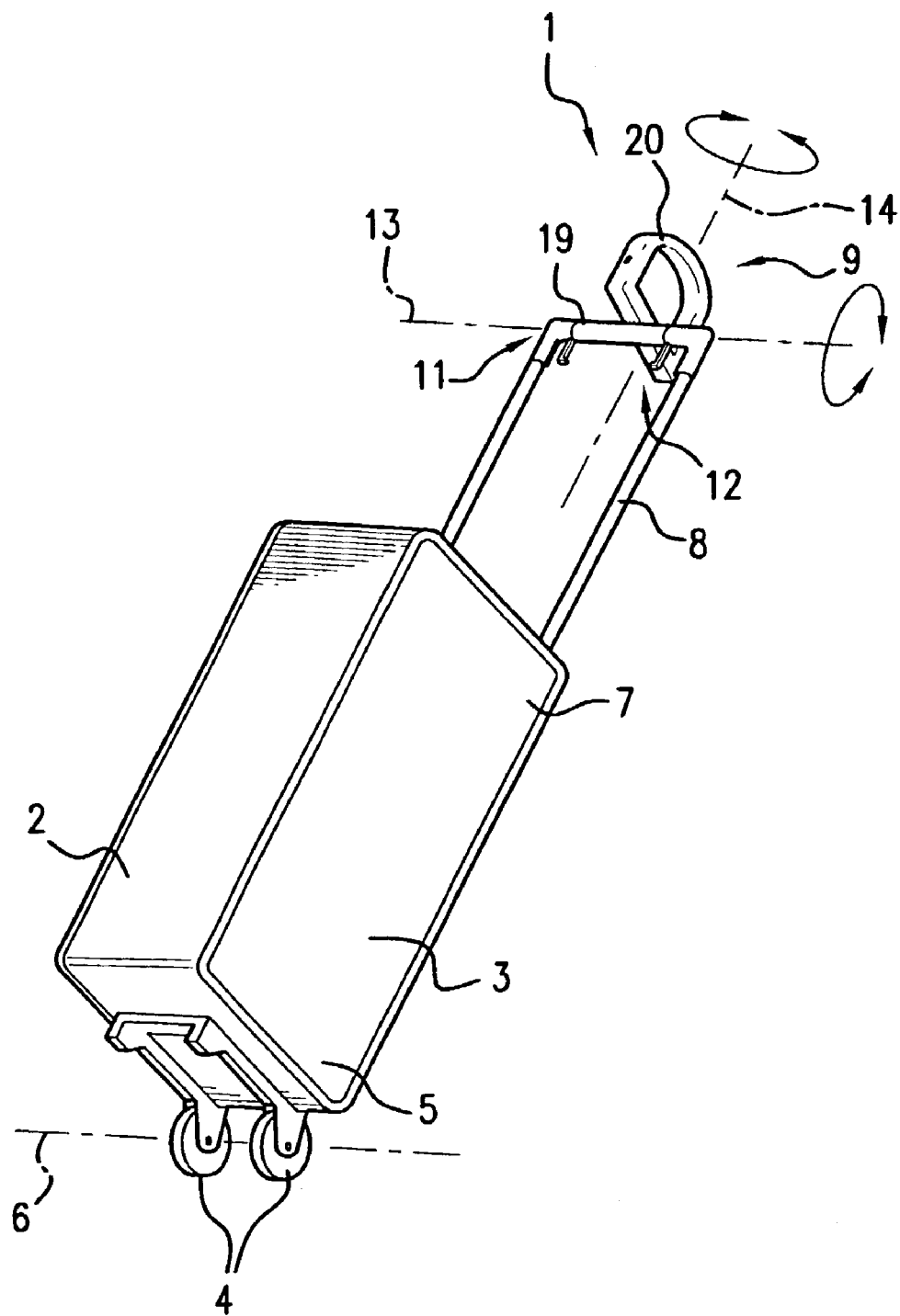
FIG. 1 shows a schematic view in perspective of a grip device in accordance with the present invention, as applied to a known suitcase.

FIG. 1 indicates a grip device 1 for a movable wheel-mounted object—in the non-limiting example shown, a suitcase 2 of the type defined by a case 3 of any shape, fitted on one end 5 with a pair of wheels 4. It should be emphasized that while the present invention is discussed principally herein in the context of a wheel-mounted suitcase, the present invention is equally applicable to a variety of other wheeled objects. Wheels 4 may be of any known type and are mounted to rotate about an axis of rotation 6, and device 1 extends from the end 7 of suitcase 2 opposite the end 5 fitted with wheels 4.

Device 1 comprises a supporting structure 8, and a longitudinally elongated grip portion 9 carried by a free end 10 of supporting structure 8 and substantially parallel to the axis of rotation 6 of wheels 4. According to the invention, device 1 also comprises first and second articulating means 11, 12 to enable grip portion 9 to rotate, with respect to supporting structure 8, about respective axes of rotation 13, 14 perpendicular to each other.

With reference also to FIGS. 2 and 3, supporting structure 8 is extensible telescopically by means of a known mechanism, and comprises two straight, parallel rods 15 sliding inside respective guides 16 connected integrally to suitcase 2. Each rod 15 is provided, at opposite longitudinal ends, with an end portion 18, and appropriate known stop means 17 (not described in detail for the sake of simplicity) for preventing withdrawal from respective guide 16. Grip portion 9 comprises a transverse member 19 and a handle-shaped body 20. Transverse member 19 connects and is fitted in rotary manner to end portions 18 by means, for example, of two pins 21 (or one pin extending through the whole of transverse member 19), which define the articulating means 11 enabling transverse member 19 to rotate about its longitudinal axis of symmetry defining axis of rotation 13, which is therefore substantially parallel to the axis of rotation 6 of wheels 4.

Body 20 comprises a through cavity 22 for insertion of the user's hand, and which is defined by two hold portions 23, 24 appropriately shaped for comfortable, effective grip by the user, located on opposite sides of cavity 22, and parallel to each other and to transverse member 19; and by two connecting portions 25 perpendicular to hold portions 23, 24. Transverse member 19 and hold portion 23 are connected to each other by respective substantially mutually contacting connecting surfaces 26, 27, and are hinged to each other by a pin 28 perpendicular to connecting surfaces 26, 27. More specifically, pin 28 projects from connecting surface 26 of transverse member 19, and is housed entirely (and secured in known manner) inside a corresponding seat 29 formed in hold portion 23. Pin 28 and respective seat 29 define the articulating means 12 enabling body 20 to rotate with respect to transverse member 19 about axis of rotation 14 defined by the longitudinal axis of pin 28 and perpendicular to axis of rotation 13.

Another important aspect of the invention lies in end portions 18 comprising respective flexible tabs 31 extending parallel to and a predetermined distance from rods 15, so as to define respective lateral gaps 32 of predetermined width between tabs 31 and rods 15. Body 20 and transverse member 19 are of a width substantially equal to the distance between tabs 31. Tabs 31 comprise respective teeth 33 extending towards each other from respective facing surfaces of tabs 31, and which interface reversibly with respective retaining seats 34 formed in connecting portions 25 of body 20, so as to define angular locking means for preventing rotation of grip portion 9 with respect to supporting structure 8.

Figure 4:
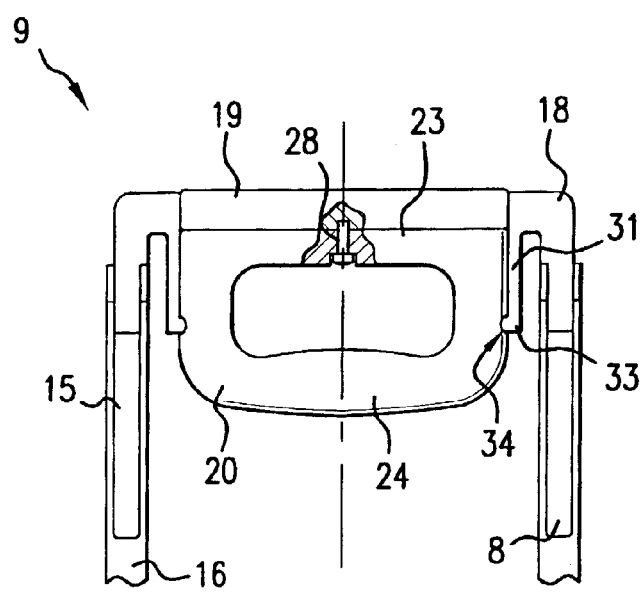
FIG. 4 shows a front view of the device according to the invention in a second work position.

Device 1 according to the invention operates as follows: transverse member 19 can be rotated 360° about axis of rotation 13, to enable grip portion 9 to rotate, with respect to supporting structure 8, between a first work position (FIG. 2) in which grip portion 9 projects from the free end 10 of supporting structure 8, and a second work position (FIG. 4) in which grip portion 9 is rotated 180° with respect to the first work position and collapsed inside supporting structure 8. It should be pointed out that the grip device of the present invention is functional when the device is in both the first work position, e.g., extended outside supporting structure 8, and the second work position, collapsed inside supporting structure 8, but the ergonomic benefits, e.g., reduced wrist discomfort and improved steering capability, provided by articulating means 11 and 12 are only fully available in the first work position.

In the first work position (FIG. 2), body 20 is located outside supporting structure 8 and can be rotated, with respect to transverse member 19 and about axis of rotation 14, into a position in which hold portions 23, 24 are substantially perpendicular to transverse member 19 and, hence, to axis of rotation 6 of wheels 4 (and therefore substantially parallel to the walking direction of the user, as shown in FIG. 1).

It should also be pointed out that in many luggage designs the telescoping support structure is not of sufficient length to comfortably accommodate taller users. When extended in the first work position, however, the grip device of the present invention has the added advantage of providing some additional length to the support structure to accommodate those taller users. In addition, this extra length also lowers the center of gravity of the wheel mounted luggage to provide extra stability, e.g., prevent rollover, during cornering, running, and other sudden maneuvers.

Advantageously, the integral grip device of the present invention folds neatly away when not in use, and eliminates the need for a user to attach and re-attach add-on handle conversion apparatus. The integral aspect of the present invention also facilitates both pulling and pushing of the attached wheel-mounted object, and ensures that the grip device will not become dislodged from its associated object while running, cornering, or making other sudden movements during travel.

In the second work position (FIG. 4), grip portion 9 is collapsed between tabs 31 and rods 15 and firmly and reversibly connected to supporting structure 8 by teeth 33 engaging respective retaining seats 34. In this position, device 1 (and hence suitcase 2) can be lifted by the user simultaneously gripping hold portion 23 and transverse member 19.

Supporting structure 8 being extensible telescopically, device 1, regardless of the position of body 20 with respect to transverse member 19, may, of course, also assume an extracted position (FIG. 2) in which rods 15 project entirely from respective guides 16, and a withdrawn position (FIG. 4) in which rods 15 are housed inside respective guides 16, from which only end portions 18 project. Lateral gaps 32 provide for making device 1 in the withdrawn position as longitudinally compact as possible, even when, as is frequently the case in this type of application, supporting structure 8 is housed inside a pocket on suitcase 2; in which case, both guides 16 and the edges of the pocket, if provided, can be inserted inside lateral gaps 32 to make device 1 as a whole extremely compact.

In one possible variation not shown in detail for the sake of simplicity, but obvious at this point to anyone skilled in the art, pin 28 is replaced with a known spherical joint enabling further rotation of body 20 with respect to transverse member 19. Needless to say, articulating means 11 and 12, as also the form of supporting structure 8, may differ from those described herein purely by way of example.

Figure 5:
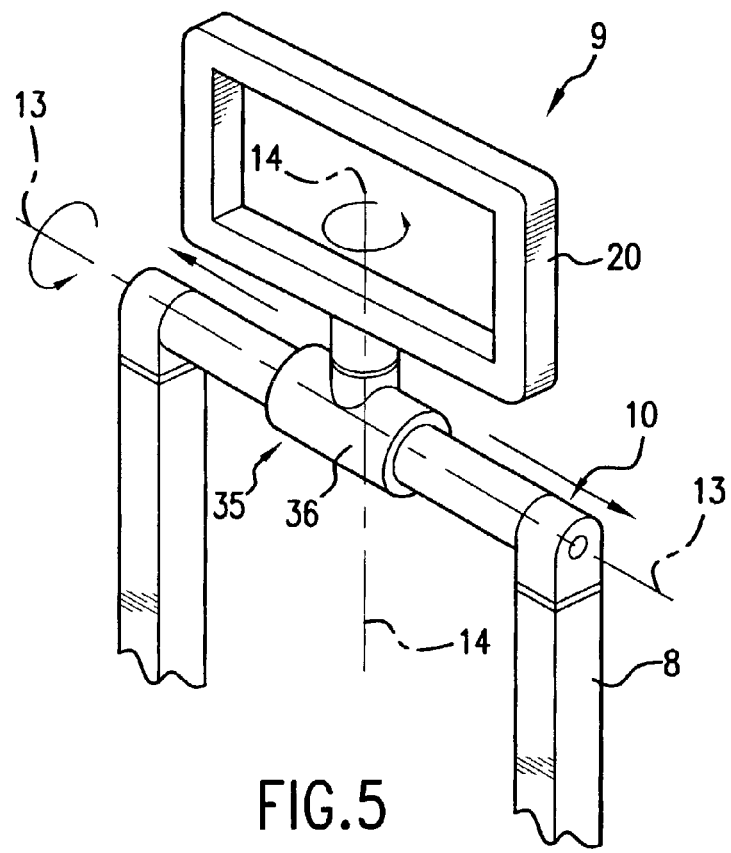
FIG. 5 shows a perspective view of a grip device in accordance with the present invention configured to provide translational movement of the grip portion with respect to its supporting structure.

In another variation shown in FIG. 5, in addition to the rotation about axes 13 and 14 provided by articulating means 11 and 12, respectively, grip portion 9 is configured to translate with respect to support structure 8 along axis 13 by means of a third articulating means 35, shown as a sleeve 36. In this configuration, the grip device provides for more convenient use by either a left-handed or a right-handed user because the handle body 20 translates to minimize undesirable interaction with the legs of a user, e.g., kicking, while the device is being pulled.

Figure 6:
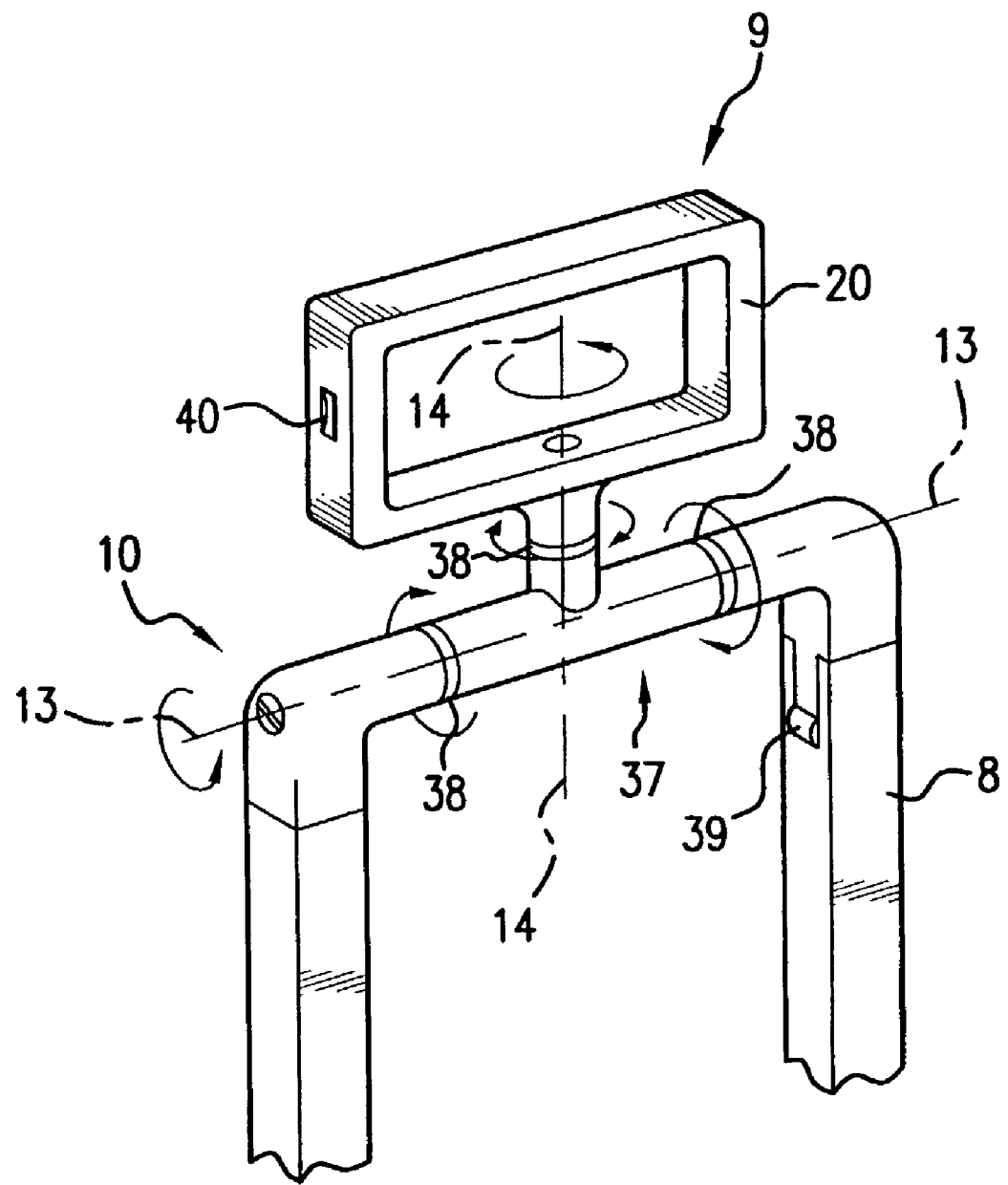
FIG. 6 shows a perspective view of a grip device in accordance with the present invention configured to provide for additional grip portion stability in a first work position.

In still another embodiment shown in FIG. 6, grip portion 9 further comprises biasing means 37, shown as a plurality of friction washers 38, that act to bias or maintain grip portion 9 in the first work position, projecting from the free end 10 of the support structure 8, when not supported by a user's hand to provide added convenience, control and stability to the user. In contrast, prior art add-on devices, such as those disclosed in U.S. Pat. No. 5,878,853 to DeRouen et al. and U.S. Pat. No. 5,722,118 to Hansen et al., would dangle from an attached handle when not in use, requiring a user to reach down for the prior art device each time he or she resumed use of the device. Returning to FIG. 6, tabs 39 on support structure 8 interface with retaining seats 40 on handle 20 to lock handle 20 in place in its second work position when collapsed inside supporting structure 8. It should be understood that biasing means 37 is not limited to friction washers 38, but may comprise any structure capable of biasing grip portion 9 in the first work position extended from support structure 8.

It should also be pointed out that the embodiments shown in FIGS. 5 & 6 are also functional when the grip device is in the second work position, collapsed inside supporting structure 8, which may be the desirable position when a user wishes to briefly lift or otherwise maneuver the wheeled object to negotiate some obstacles.

It should also be emphasized that the device according to the invention applies, not only to wheel-mounted suitcases (of or other than the type described herein by way of example), but also to trolleys for various use, or to any other movable wheel-mounted object for manually transporting items of various types.

While the present invention has been described with reference to the preferred embodiments, those skilled in the art will recognize that numerous variations and modifications may be made without departing from the scope of the present invention. Accordingly, it should be clearly understood that the embodiments of the invention described above are not intended as limitations on the scope of the invention, which is defined only by the following claims.

The invention claimed is:

1. A grip device integral with a movable object mounted on wheels, the grip device comprising:

a supporting structure having two longitudinal members;

a grip portion comprising a transverse member spanning the two longitudinal members and substantially parallel to an axis of rotation of the wheels and a handle shaped body connected to the transverse member; and first and second articulating means permitting rotation of the handle shaped body about a first axis of rotation and a second axis of rotation, respectively, the first and second axes being perpendicular to each other, wherein the first articulating means permits rotation of the handle shaped body between a first work position and a second work position, the grip device further comprising biasing means for biasing the handle shaped body in at least the first work position.

2. The device of claim 1, wherein the biasing means comprises at least one friction washer.

3. The device of claim 1, wherein the first axis of rotation is parallel to the axis of rotation of the wheels, the first articulating means permitting rotation of the handle shaped body, with respect to the supporting structure, between a first work position wherein the handle shaped body projects from a free end of the supporting structure, and a second work position wherein the handle shaped body is turned 180° with respect to the first work position and collapsed inside the supporting structure.

4. The device of claim 3, further comprising locking means for preventing rotation of the handle shaped body with respect to the supporting structure and keeping the handle shaped body firmly and reversibly connected to the supporting structure when the handle shaped body is in the second work position.

5. The device of claim 4, wherein the locking means comprises connecting means for connecting the handle shaped body and the supporting structure.

6. The device of claim 5, wherein the handle shaped body and the transverse member abut each other along substantially mutually contacting surfaces, and are hinged to each other by a pin that extends perpendicular to the contacting surfaces.

7. The device of claim 6, wherein the handle shaped body comprises a cavity for insertion of a user's hand and first and second parallel hold portions located on opposite sides of the cavity and parallel to the transverse member, wherein the pin projects from the contacting surface of the transverse member and is housed entirely inside a seat formed in the first hold portion of the handle shaped body.

8. The device of claim 7, wherein the longitudinal members of the supporting structure are extensible telescopically, and comprise two parallel rods sliding inside respective guides and having respective end portions; the transverse member being located along the first axis of rotation to connect the end portions, and being connected in rotary manner to the end portions.

9. The device of claim 8, wherein the connecting means comprise flexible tabs carried by the end portions and having respective teeth which interface with respective retaining seats formed on the handle shaped body.

10. The device of claim 9, wherein the flexible tabs extend parallel to and a predetermined distance from the rods, respective lateral gaps of predetermined width being defined between the rods and the tabs, and wherein the handle shaped body has a width substantially equal to the distance between the tabs.

11. A movable object mounted on wheels having an integral grip device, the grip device comprising:

a supporting structure having two longitudinal members;

a grip portion comprising a transverse member spanning the two longitudinal members and substantially parallel to an axis of rotation of the wheels and a handle shaped body connected to the transverse member; and first and second articulating means permitting rotation of the handle shaped body about a first axis and a second axis of rotation, respectively, that are perpendicular to each other, wherein the first articulating means permits rotation of the handle shaped body between a first work position and a second work position, the grip device further comprising biasing means for biasing the handle shaped body in at least the first work position.

12. The object of claim 11, wherein the object is luggage.

13. The object of claim 11, wherein the first axis of rotation is parallel to the axis of rotation of the wheels, the first articulating means permitting rotation of the handle shaped body, with respect to the supporting structure, between a first work position wherein the handle shaped body projects from a free end of the supporting structure, and a second work position wherein the handle shaped body is turned 180° with respect to the first work position and collapsed inside the supporting structure.

14. The object of claim 13, further comprising locking means for preventing rotation of the handle shaped body with respect to the supporting structure and keeping the handle shaped body firmly and reversibly connected to the supporting structure when the handle shaped body is in the second work position.

15. The object of claim 14, wherein the locking means comprises connecting means for connecting the handle shaped body and the supporting structure.

16. The object of claim 15, wherein the handle shaped body and the transverse member abut each other along substantially mutually contacting surfaces, and are hinged to each other by a pin that extends perpendicular to the contacting surfaces.

17. The object of claim 16, wherein the handle shaped body comprises a cavity for insertion of a user's hand and first and second parallel hold portions located on opposite sides of the cavity and parallel to the transverse member wherein the pin projects from the contacting surface of the transverse member and is housed entirely inside a seat formed in the first hold portion of the handle shaped body.

18. The object of claim 11, wherein the biasing means comprises at least one friction washer.

19. The object of claim 11, wherein the longitudinal members of the supporting structure are extensible telescopically, and comprise two parallel rods sliding inside respective guides and having respective end portions; the transverse member being located along the first axis of rotation to connect the end portions, and being connected in rotary manner to the end portions.

20. The object of claim 19, wherein the connecting means comprise flexible tabs carried by the end portions and having respective teeth which interface with respective retaining seats formed an the handle shaped body.

21. The object of claim 20, wherein the tabs extend parallel to and a predetermined distance from the rods; respective lateral gaps of predetermined width being defined between the rods and the tabs; and the handle shaped body being of a width substantially equal to the distance between the tabs.

22. A grip device integral with a movable object mounted on wheels comprising:

a supporting structure having two longitudinal members;

a grip portion comprising a transverse member spanning the two longitudinal members and substantially parallel to an axis of rotation of the wheels and a handle shaped body connected to the transverse member; and other;

wherein the first axis of rotation is parallel to an axis of rotation of the wheels, the first articulating means permitting rotation of the handle shaped body with respect to the supporting structure, between a first work position wherein the handle shaped body projects from a free end of the supporting structure, and a second work position wherein the handle shaped body is turned 180° about the first axis of rotation with respect to the first work position, the grip portion further comprising biasing means for biasing the handle shaped body in at least the first work position.

* * * * *